United States Patent
Cao et al.

(10) Patent No.: US 7,218,947 B2
(45) Date of Patent: May 15, 2007

(54) TELECOMMUNICATIONS NETWORK COMPRISING A BASE STATION AND A MOBILE STATION, AND A METHOD OF TRANSFERRING TO AND/OR ADDING INTO A CALL CONNECTION AT LEAST ONE OTHER UPLINK CHANNEL FOR USER DATA

(75) Inventors: Qiang Cao, Swindon (GB); Patrick Georges Venceslas Charriere, Tetbury (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 565 days.

(21) Appl. No.: 10/351,042

(22) Filed: Jan. 27, 2003

(65) Prior Publication Data

US 2003/0144021 A1 Jul. 31, 2003

(30) Foreign Application Priority Data

Jan. 28, 2002 (GB) .................................. 0201880.2

(51) Int. Cl.
*H04Q 7/20* (2006.01)
*H04B 7/00* (2006.01)

(52) U.S. Cl. ..................... 455/522; 455/442; 455/502
(58) Field of Classification Search ................ 455/522, 455/69, 127.1, 343.1, 68, 502, 442
See application file for complete search history.

(56) References Cited

U.S. PATENT DOCUMENTS

| 6,856,813 B2* | 2/2005 | Baker et al. ................. 455/522 |
| 6,967,942 B2* | 11/2005 | Smolinske et al. ......... 370/346 |
| 2001/0029169 A1* | 10/2001 | Agin ........................... 455/88 |
| 2001/0036813 A1* | 11/2001 | Baker et al. .................. 455/69 |

FOREIGN PATENT DOCUMENTS

EP  1 180 907 A2  6/2001

* cited by examiner

*Primary Examiner*—Tilahun Gesesse

(57) ABSTRACT

A telecommunications network comprises a base station and a mobile station in use in call connection on at least one uplink channel for communicating user data. The base station is operative such that on receipt of a command to transfer to and/or add at least one other uplink channel for communicating user data, the at least one other uplink channel is allocated to the call connection after a predetermined period during which power level adjustment is undertaken to compensate for mobile station movement.

16 Claims, 3 Drawing Sheets

TELECOMMUNICATIONS NETWORK COMPRISING A BASE STATION AND A MOBILE STATION, AND A METHOD OF TRANSFERRING TO AND/OR ADDING INTO A CALL CONNECTION AT LEAST ONE OTHER UPLINK CHANNEL FOR USER DATA

CROSS REFERENCE TO RELATED APPLICATION

This application claims priority of European Application No. 0201880.2 filed on Jan. 28, 2002.

TECHNICAL FIELD

The present invention relates to a telecommunications network comprising a base station and a mobile station in use in call connection on at least one uplink channel for communicating user data.

The present invention also relates to a method of transferring to and/or adding into a call connection at least one other uplink channel for user data in a telecommunications network.

BACKGROUND OF THE INVENTION

In current Third Generation Partnership Project 3GPP standards for mobile telecommunications such as Universal Mobile Telecommunications System UMTS, as shown in FIG. 1 when a radio network controller RNC requests a base station (Node B in UMTS terminology) to reconfigure its radio channel (bearer) to any particular mobile station (User Equipment in UMTS terminology, UE), the base station (Node B) will effect the reconfiguration only after it receives a Radio Link Reconfiguration Prepare message including configuration parameters as to the new uplink and downlink radio channels to be used, responds with a Radio Link Reconfiguration Ready message and then receives Radio Link Reconfiguration Commit message. The configuration parameters, i.e. which other new channels are to be used, are specified in the Radio Link Reconfiguration Prepare message. The radio link is, of course, synchronous, requiring both base station and mobile station to transmit and receive at expected times.

Importantly, as shown in FIG. 1, receipt of the Radio Link Reconfiguration Ready message by the base station results in the new radio data channels being allocated by the base station although not used until later. These significant resources are thus unused for a considerable time.

As also shown in FIG. 1, a Radio Bearer Reconfiguration message is then sent from the radio network controller RNC to the mobile station UE. Once reconfiguration is complete, a Radio Bearer Configuration Complete message is returned to the radio network controller RNC. Both the mobile station (UE) and base station (Node B) then start transmission with new channel configuration at a specified activation time denoted by a connection frame number CFN as part of the Radio Bearer Reconfiguration message.

Once the radio network controller RNC and a base station (Node B) making up the UMTS terrestrial radio access network UTRAN have performed these steps of instructing synchronous radio link reconfiguration, downlink transmission starts but both the mobile station (UE) and UMTS terrestrial radio access network UTRAN may need to re-run the so-called inner loop power control procedure described in the 3GPP UMTS standards due to the new radio channel configuration. This is to ensure that before user data is transmitted, the inner loop power control, which compensates for fluctuations due to mobile station movement and consequential fading, is properly set up and functioning. The time period required for inner loop power control can be up to 7 frames (70 ms). This time period is denoted Power Control Preamble (PCP) length, and is indicated to the mobile station in the Radio Bearer Reconfiguration message sent from the radio network controller RNC. As shown in FIG. 1, whilst the inner loop power control is running (in the PCP length period) no user data is transmitted uplink but the channel designated for transmission of user data uplink is reserved—i.e., allocated but not used. This means that the channels are committed by the base station (Node B) for at least the duration of the PCP length period doing nothing (i.e., not communicating user data), which is a waste of scarce radio resources.

In this text, uplink means from the mobile station to the base station, and downlink means from the base station to the mobile station.

SUMMARY OF THE INVENTION

The present invention provides a telecommunications network comprising a base station and a mobile station in use in call connection on at least one uplink channel for communicating user data, the base station being operative such that following receipt of a command to transfer to and/or add at least one other uplink channel for communicating user data, the at least one other uplink channel is allocated to the call connection after a predetermined period during which power level adjustment is undertaken to compensate for mobile station movement.

Advantageously the power level adjustment is uplink power level adjustment, and preferably comprises adjusting power of a signal transmitted by the mobile station in a channel for control signalling until a target accuracy for reception by the base station is reached, the mobile station being operative to note this power as that to be used on said at least one other uplink channel for user data.

Advantageously the network is a network in accordance with Universal Mobile Telecommunications System UMTS standards. The uplink channels are preferably dedicated physical data channels (DPDCHs). Advantageously, the predetermined period is the Power Control Preamble PCP length, inner loop power control at the mobile station being undertaken during the predetermined period. The base station is preferably commanded to transfer to the or each other uplink channel by a radio network controller RNC, information as to the predetermined period being sent to the base station in a Radio Link Reconfiguration Commit command.

Advantages of the present invention in its preferred embodiments are that when the RNC sends message to base station (Node B) for radio link reconfiguration, PCP length information is included such that base station (Node B) can commit the channel specified in the message at the end of PCP period. This allows for dynamic channel allocation, which efficiently uses the channel for other calls during the PCP period. This advantageously increases overall UMTS terrestrial radio access network UTRAN capability, especially for high speed packet data, and enables further developments in the area of dynamic channel allocation.

Advantageously, the base station comprises a clock for controlling the timing of receiving signals and the mobile station comprises a clock for controlling the timing of transmitting signals, the base station adjusting its clock during the predetermined period so as to bring its clock into synchronisation with the clock of the mobile station.

The present invention also relates to corresponding methods.

The present invention also provides a method of transferring to and/or adding into a call connection at least one other uplink channel for user data in a telecommunications network comprising a base station and a mobile station in call connection having at least one uplink channel for user data with the base station, the method comprising the step of providing a delay of at least a predetermined period between receiving a command to transfer to or add the at least one other uplink channel and the at least one other uplink channel being allocated, power level adjustment to compensate for mobile station movement being undertaken in the predetermined period.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

Figure 1:
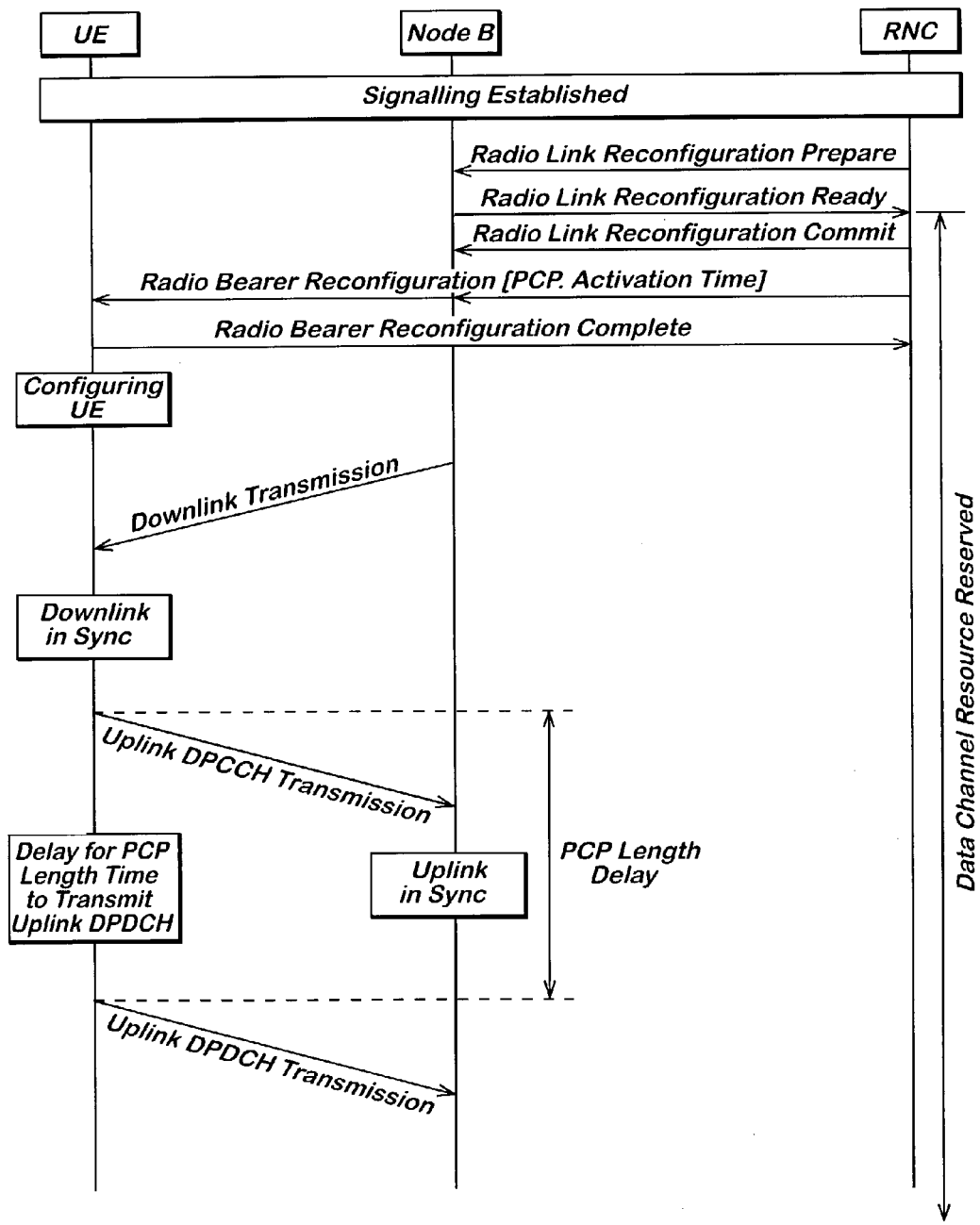
FIG. 1 is a diagrammatic illustration of a prior art radio channel reconfiguration sequence.
Figure 2:
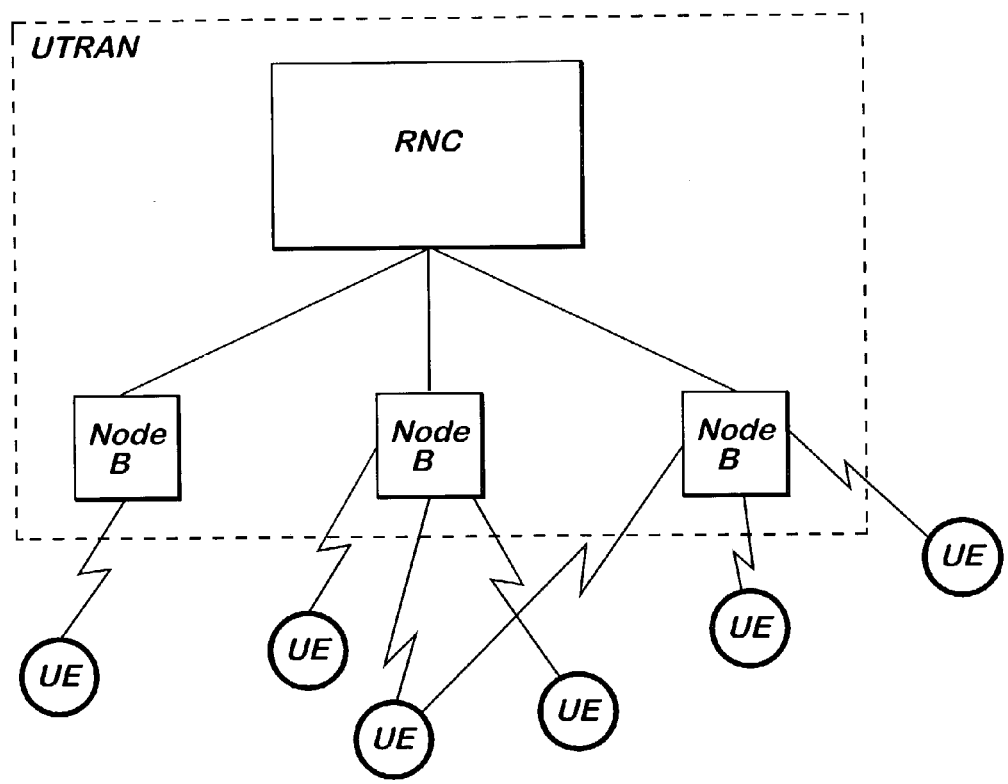
FIG. 2 is a diagrammatic illustration of a UMTS telecommunications network according to the present invention.

As shown in FIG. 2, the preferred UMTS telecommunications network consists of a UMTS terrestrial radio access network UTRAN and a number of mobile stations UE. The UMTS terrestrial radio access network UTRAN consists of several base stations (Node B's) each communicating with and under the control of a radio network controller RNC. Each base station has a coverage area and communicates by radio with mobile stations UEs within its coverage area by calls set up over radio channels.

Figure 3:
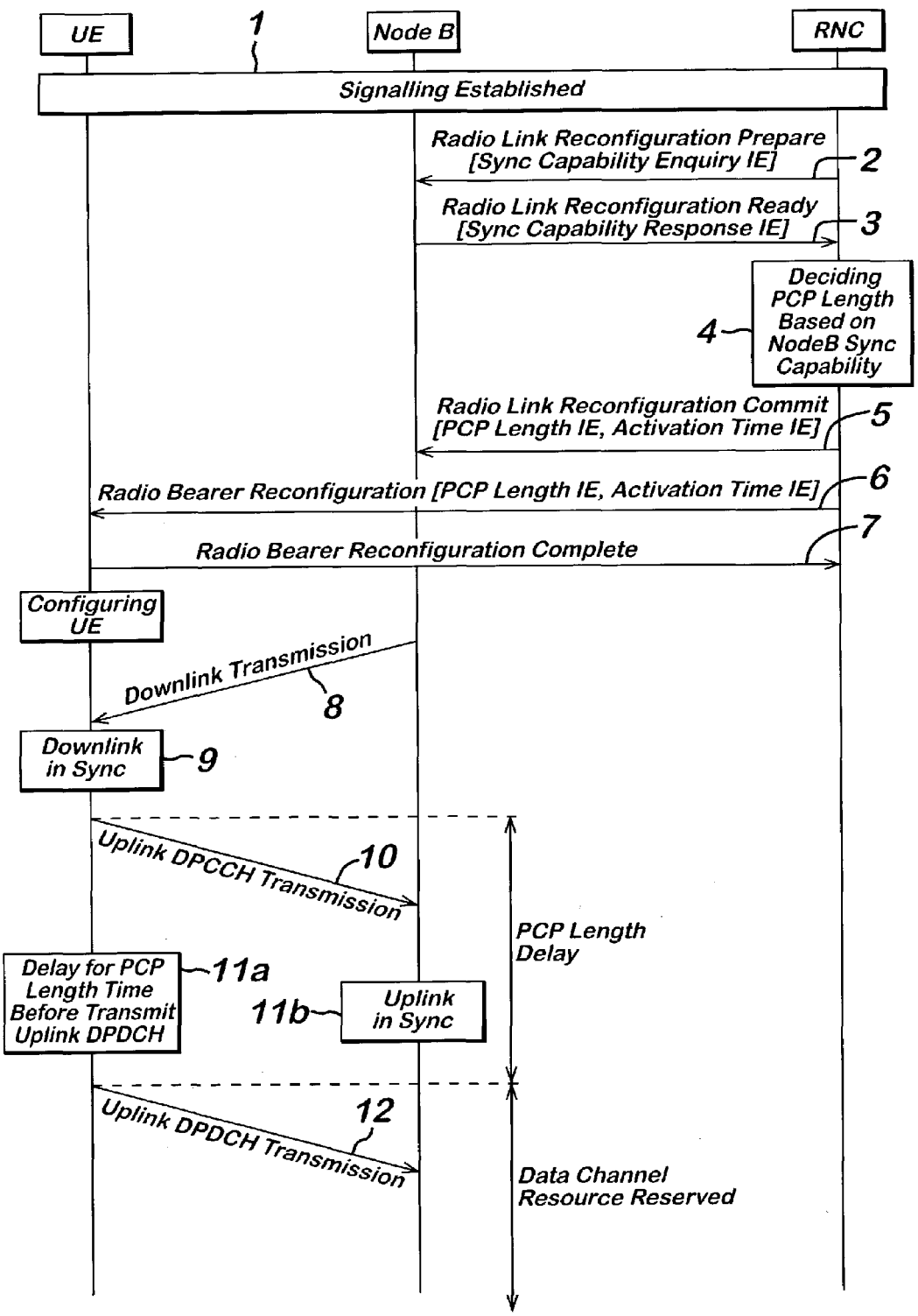
FIG. 3 is a diagrammatic illustration of a preferred radio channel reconfiguration sequence.

As shown in FIG. 3 in which the steps as numbered below are shown, the message sequence involved in radio channel reconfiguration, i.e., transferring to other uplink and downlink radio channels starts after (1) control-signalling between a radio network controller RNC, a base station Node B, and a mobile station UE has been established.

(2) A Radio Link Reconfiguration Prepare message is then sent from the radio network controller RNC to the base station (Node B), that message including an enquiry information element in respect of its synchronisation capability, namely how much time would be required to adjust its reception timer so as to bring its capturing of received data from the mobile station into line with the timing of the data transmitted from the base station.

(3) The base station responds to the RNC with a Radio Link Reconfiguration Ready message indicating the synchronisation capability of the base station.

(4) The RNC determines the time required for rerunning a power control loop, this being the Power Control Preamble time period (PCP length). This time is more than the time required for synchronisation (synchronisation capability).

(5) The RNC sends a Radio Link Reconfiguration Commit message to the base station including information indicating the required PCPlength and activation time, i.e. when the radio channel to the mobile station should be reconfigured.

(6) A Radio Bearer Reconfiguration message including information elements indicative of Power Control Preamble length (PCP length, in milliseconds) and activation time is then sent from the RNC passed via the base station to the mobile station. As mentioned previously, Power Control Preamble (PCP) length is the time required for inner loop power control, which compensates for fluctuations due to mobile station movement and consequential fading. This time period can be up to 7 frames (70 ms).

(7) The mobile station responds with a Radio Bearer Reconfiguration Complete message passed by the base station back to the RNC.

(8) A process of adjusting the mobile station to the new radio channels then starts with downlink (i.e., to the mobile station) transmission from the base station on the new downlink radio channel, (9) the mobile station adjusts its reception timer so as to bring its capturing of received data into line with the timing of the data transmitted from the base station, and then

(10) starts transmitting control signalling uplink to the base station on a dedicated physical control channel DPCCH, which (11a) starts inner loop power control by the base station during the PCP length period and (11b) causes the base station to adjust its reception timer so to bring its capturing of received data into synchronisation with the timing of the data transmitted from the mobile station.

(12) Only after a time period of the Power Control Preamble (PCP length) has passed from the start of uplink dedicated physical control channel signalling (step 10 above), a dedicated uplink physical channel, including associated channel elements such as code division multiple access CDMA code, is allocated by the base station allowing uplink transmission of user data to start. Before then that data channel resource is available for other users and other call connections.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

We claim:

1. A telecommunications network comprising a base station controller, and a base station and a mobile station in call connection on at least one uplink channel for communicating user data, the base station being operative such that following receipt of a command from the base station controller to transfer to and/or add at least one other uplink channel for communicating user data, the at least one other uplink channel being reserved for the call connection only after a predetermined period during which power level adjustment is undertaken to compensate for mobile station movement.

2. A telecommunications network according to claim 1, in which the power level adjustment is uplink power level adjustment.

3. A telecommunications network according to claim 2, in which the power level adjustment comprises adjusting power of a signal transmitted by the mobile station in a channel for control signalling until a target accuracy for reception by the base station is reached, the mobile station being operative to note this power as that to be used on said at least one other uplink channel for user data.

4. A telecommunications network according to claim 1, being a network in accordance with Universal Mobile Telecommunications System UMTS standards.

5. A telecommunications network according to claim 4, in which the uplink channels are dedicated physical data channels (DPDCHs).

6. A telecommunications network according to claim 4, in which the predetermined period is the Power Control Preamble PCP length, the power level adjustment being inner loop power control at the mobile station.

7. A telecommunications network according to claim 4, in which the base station is commanded to transfer to said at least one other uplink channel by a radio network controller RNC, information as to the predetermined period being sent to the base station in a Radio Link Reconfiguration Commit command.

8. A telecommunications network according to claim 1, in which the base station comprises a clock for controlling the timing of receiving signals and the mobile station comprises a clock for controlling the timing of transmitting signals, the base station adjusting its clock during the predetermined period so as to bring its clock into synchronisation with the clock of the mobile station.

9. A method of transferring to and/or adding into a call connection at least one other uplink channel for user data in a telecommunications network comprising a base station and a mobile station in call connection having at least one uplink channel for user data with the base station, the method comprising the step of providing a delay of at least a predetermined period between receiving a command to transfer to or add the at least one other uplink channel and then the at least one other uplink channel being reserved for the call connection , power level adjustment to compensate for mobile station movement being undertaken in the predetermined period.

10. A method according to claim 9, in which the power level adjustment is uplink power level adjustment.

11. A method according to claim 10, in which the power level adjustment comprises adjusting power of a signal transmitted by the mobile station in a channel for control signalling until a target accuracy for reception by the base station is reached, and noting this power as that to be used on the at least one other uplink channel for user data.

12. A method according to any of claim 9, in which the network operates in accordance with Universal Mobile Telecommunications System UMTS standards.

13. A method according to claim 12, in which the uplink channels are dedicated physical data channels (DPDCHs).

14. A method according to claim 12, in which the predetermined period is the Power Control Preamble POP length, the power level adjustment undertaken being inner loop power control at the mobile station.

15. A method according to claim 12, in which a radio network controller RNC commands the base station to transfer to or add at least one other uplink channel, information as to the predetermined period being sent to the base station in a Radio Link Reconfiguration Commit command.

16. A method according to claim 9, in which the base station comprises a clock for controlling the timing of receiving signals and the mobile station comprises a clock for controlling the timing of transmitting signals, the base station adjusting its clock during the predetermined period so as to bring its clock into synchronisation with the clock of the mobile station.

\* \* \* \* \*